United States Patent [19]
Atmur et al.

[11] Patent Number: 5,560,455
[45] Date of Patent: Oct. 1, 1996

[54] BRAKES ROTORS/DRUMS AND BRAKE PADS PARTICULARLY ADAPTED FOR AIRCRAFT/TRUCK/TRAIN/ AND OTHER HEAVY DUTY APPLICATIONS

[75] Inventors: Steven D. Atmur, Riverside; Thomas E. Strasser, Corona, both of Calif.

[73] Assignee: Northrop Grumman Corporation, Los Angeles, Calif.

[21] Appl. No.: 515,888

[22] Filed: Aug. 16, 1995

[51] Int. Cl.[6] .................................................. F16D 65/10
[52] U.S. Cl. .................. 188/251 A; 188/71.5; 188/73.2; 188/251 M; 188/218 XL; 192/107 M
[58] Field of Search ......................... 188/251 A, 251 M, 188/73.2, 218 XL, 73.1, 71.5; 192/107 M; 501/89; 428/564; 264/60; 523/155

[56] References Cited

U.S. PATENT DOCUMENTS

| 3,880,969 | 4/1975 | Latos . |
| 4,067,829 | 1/1978 | Garrett . |
| 4,206,598 | 6/1980 | Rao et al. . |
| 4,207,660 | 6/1980 | Rao et al. . |
| 4,233,361 | 11/1980 | Fultz . |
| 4,245,611 | 1/1981 | Mitchell et al. . |
| 4,294,788 | 10/1981 | Laskow et al. . |
| 4,311,541 | 1/1982 | Fultz . |
| 4,341,826 | 7/1982 | Prewo et al. . |
| 4,606,434 | 8/1986 | Vasilow et al. . |
| 4,657,951 | 4/1987 | Takarada et al. . |
| 4,808,275 | 2/1989 | Ohzora et al. ..................... 188/251 M |
| 4,818,732 | 4/1989 | Fox et al. . |
| 4,884,400 | 12/1989 | Tanaka et al. . |
| 4,887,518 | 12/1989 | Hayakawa . |
| 4,928,645 | 5/1990 | Berneburg et al. . |
| 4,972,674 | 11/1990 | Yamada et al. . |
| 4,981,820 | 1/1991 | Renlund et al. . |
| 5,000,136 | 3/1991 | Hansen et al. . |
| 5,018,661 | 5/1991 | Cyb . |
| 5,063,881 | 11/1991 | Kawamura . |
| 5,094,200 | 3/1992 | Fontichiaro . |
| 5,114,262 | 3/1992 | Kojima . |
| 5,126,087 | 6/1992 | Lespade et al. . |
| 5,137,789 | 8/1992 | Kaushal . |
| 5,140,813 | 8/1992 | Whittenberger . |
| 5,180,694 | 1/1993 | Renlund et al. . |
| 5,203,228 | 4/1993 | Miyawaki et al. . |
| 5,224,335 | 7/1993 | Yoshizaki . |
| 5,224,572 | 7/1993 | Smolen, Jr. et al. . |
| 5,225,283 | 7/1993 | Leung et al. . |
| 5,231,059 | 7/1993 | Leung et al. . |
| 5,244,720 | 9/1993 | Leung et al. . |
| 5,258,084 | 11/1993 | Leung et al. . |
| 5,325,941 | 7/1994 | Farinacci et al. ................. 188/218 XL |
| 5,404,721 | 4/1995 | Hartsock . |

Primary Examiner—Douglas C. Butler
Attorney, Agent, or Firm—Terry J. Anderson; Karl J. Hoch, Jr.

[57] ABSTRACT

A structural fiber reinforced ceramic matrix composite material adapted for high temperature brake use is disclosed as used for the entirety of components of a brake system and as brake pads which can be used in the normal manner for brake pads. Also disclosed is a method of integrally molding the brake pads to the surfaces of metal brake parts.

33 Claims, 5 Drawing Sheets

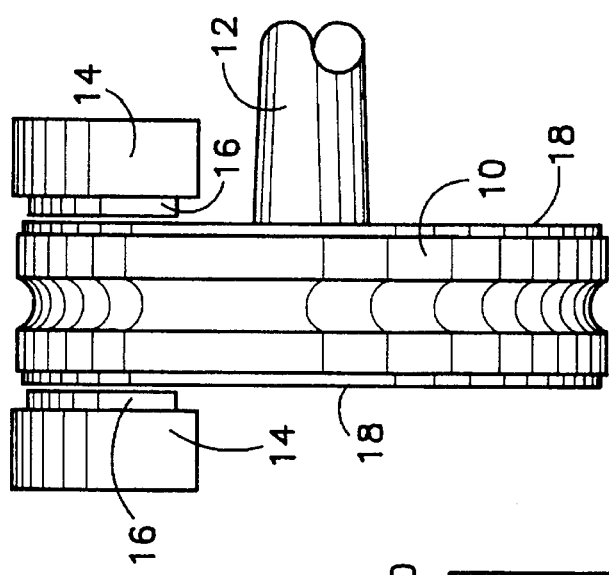
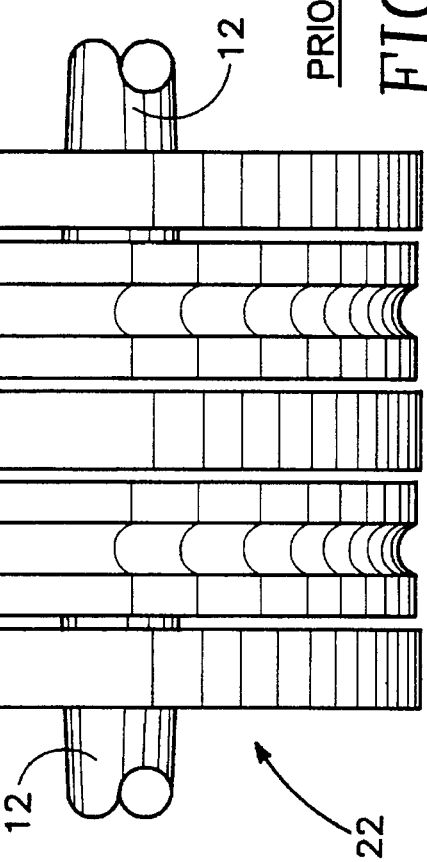
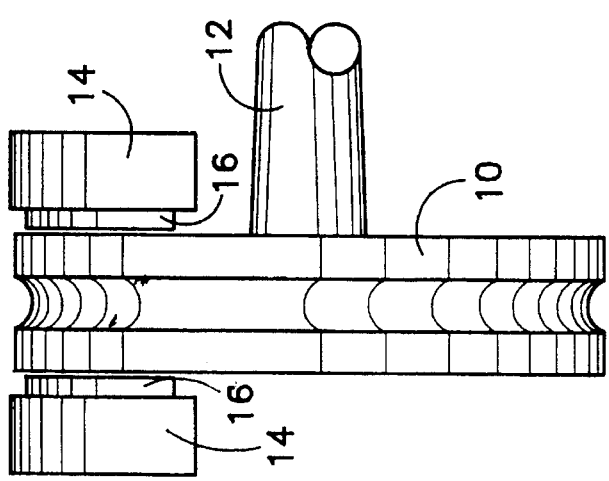

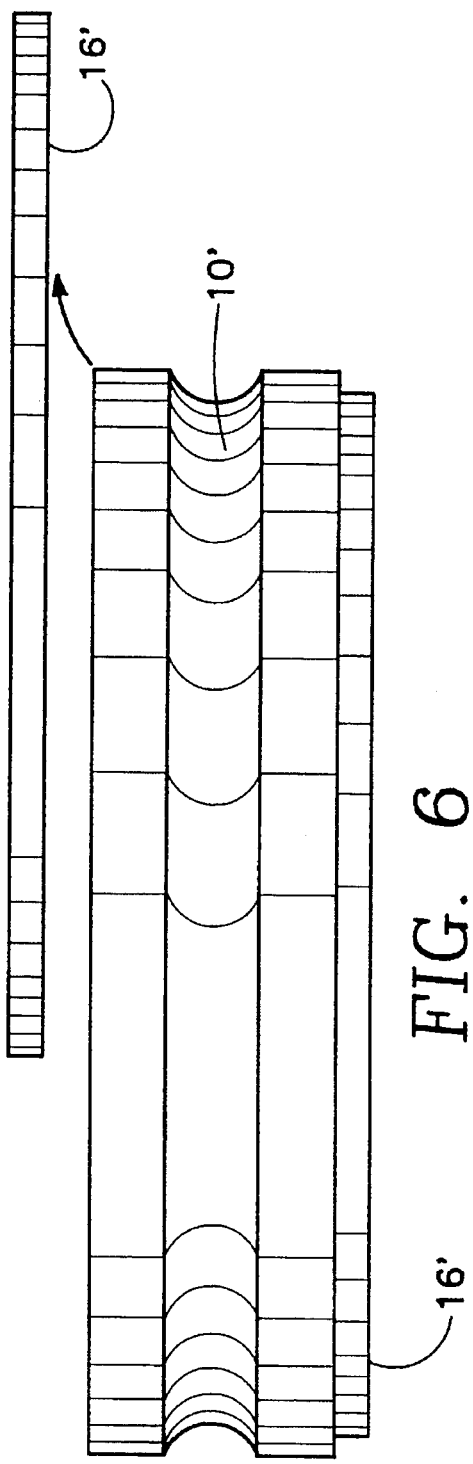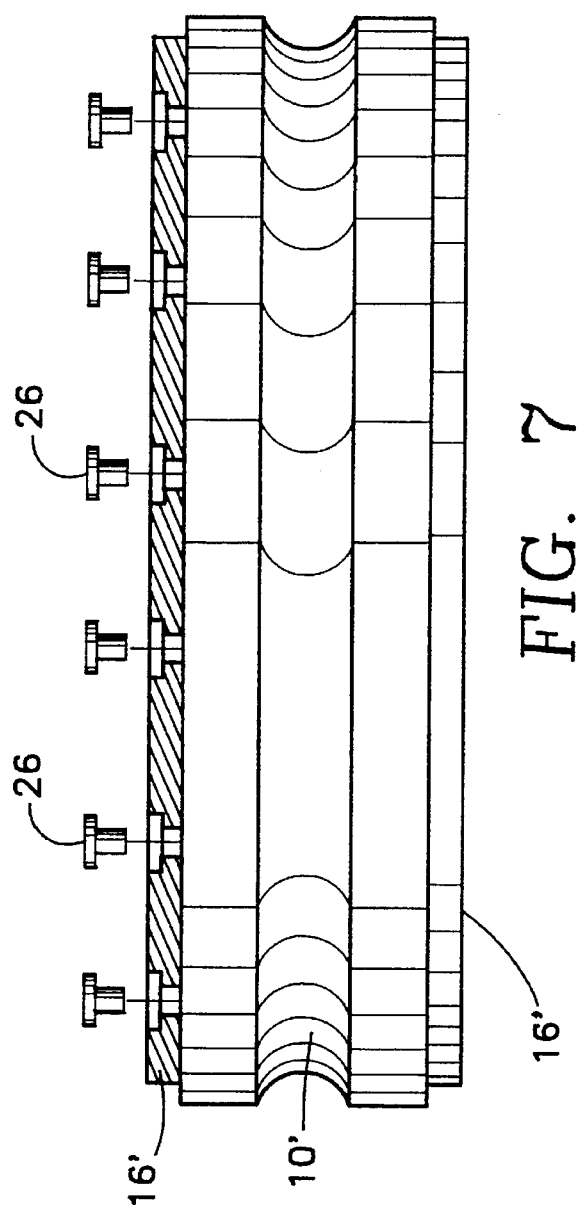

BRAKES ROTORS/DRUMS AND BRAKE PADS PARTICULARLY ADAPTED FOR AIRCRAFT/TRUCK/TRAIN/ AND OTHER HEAVY DUTY APPLICATIONS

BACKGROUND OF THE INVENTION

1. Technical Field

This invention relates to brakes used on heavy vehicles such as aircraft, trucks, trains, and, more particularly, to a structural fiber reinforced ceramic matrix composite material adapted for high temperature brake use for the entirety of components of a brake system or as brake pads which can be used in the normal manner for brake pads. It also relates to a method of integrally molding fiber reinforced ceramic matrix composite brake components and attaching them to the surfaces of metal brake parts.

2. Background Art

Any vehicle that moves typically is provided with a brake system with which to stop it. The lighter the combined stopping weight, the fewer the problems involved in designing a brake system which will last for an extended period of time and then be easy and inexpensive to replace or renovate. Thus, a vehicle such as a bicycle can be fitted with small rubber pads that squeeze and grip the rims of the wheels which will last virtually forever and which can be replaced in a few minutes at little expense.

When one gets to the mass of an automobile, which may contain a number of passengers, frictional heat build-up during stopping becomes a problem to be considered. Most automobiles today employ a so-called caliper disk brake on at least the front wheels since during stopping the weight of the vehicle is moved forward to the front wheels due to the force of inertia. Disk brakes as depicted in FIG. 1 have good stopping power for various reasons. A rotor 10 carries the wheel (not shown) on a shaft 12. As the wheel rotates, the rotor 10 rotates in combination with it. The rotor 10 is disposed between a pair of calipers 14 having brake pads 16 thereon. To stop the automobile, hydraulic pressure is used to move the calipers 14 together until the rotor 10 is squeezed under pressure between the pads 16. The calipers 14 are attached to the frame of the automobile and cannot rotate. The pads 16 are of a high friction material that resists deterioration and wear under fairly high temperature conditions. Thus, when the rotor 10 is squeezed by the calipers 14, a high frictional stopping force is applied to the rotor 10, bringing the automobile to a stop. Since the pads 16 are flat and contact the flat sides of the rotor 10, the entire area of the pads 16 contacts the rotor 10 to impart the stopping forces. This is in contrast to so-called "drum" brakes wherein the shoe carrying the pad is a circular arc which is supposed to match and fit the inside of a cylindrical brake drum. If there is a mismatch, only small parts of the pad actually rub on the drum. And, if there is a lot of frictional force generating a lot of frictional heat, the drum can be warped out of shape from the heat. With the disk brake, by contrast, the rotor 10 is in the air stream passing under the automobile, is thicker, and is therefore usually able to dissipate any heat build-up that takes place. And, even if minor warping should take place, the calipers are usually in a floating mounting that can follow the resultant wobble of the rotor.

To further prevent any damage to the surface of the rotor 10, the prior art suggests facing the rotor 10 with a monolithic ceramic coating 18, which may or may not work for its intended purpose within the environment of an automobile. It definitely would not work for a braking system environment such as that addressed by the present invention.

When it comes to stopping an airplane, the braking system is an entirely different story. Particularly with a so-called "jumbo" jet carrying hundreds of passengers plus their baggage and freight in addition to the weight of the airplane itself, designing a successful braking system is a major undertaking. The prior art is depicted in FIG. 3 in simplified form. There are a plurality of rotors 10' carrying shafts 12 which, in turn, carry the wheels (not shown) of the airplane. The rotors 10' are stacked with a plurality of stators 20 into a stack 22. While only two rotors 10' are shown, it is for simplicity only and many rotors 10' and stators 20 may be in the stack 22 of a typical airplane brake. The stack 22 is disposed between pairs of wheels. The stators 20 are fixed and do not rotate while the rotors 10' rotate in combination with the wheels. To apply the brake and stop the airplane, hydraulic pressure is applied which causes the stack 22 to be compressed together thereby squeezing the rotating rotors 10' between the fixed stators 20.

With smaller aircraft, the above-described brake construction was not a problem and worked well for its intended purpose. With the advent of large jets (both commercial and military) the frictional forces and attendant heat build-up soon became a major factor. This is particularly true with an aborted take-off with non-normal braking, which can result in the complete destruction of the entire brake stack 22. Modern jet brakes are of three types—all steel (rotors and pads), or steel rotors with sintered pads, and carbon/carbon rotors and pads. With an all steel brake system, both the stators 20 and rotors 10' are made of high quality steel specifically designed for the purpose. The steel/steel brakes develop good internal frictional forces. This is necessary in order to stop the airplane. If friction is removed, there is no heat build-up; but, there is also no stopping force created. Under the conditions of a normal stop, the brakes are applied in such a manner that they can dissipate the heat generated before it becomes a problem. Also, the so-called "jet brake" created by reversing the thrust of the jet engines is used to slow the airplane so that the brakes do not have to do all the work. The airplane is never brought completely to a stop from landing speed so that the rotors 10' and stators 20 are separated in the stack 22 as the heat created in them from frictional forces is dissipated.

In an aborted take-off, the airplane has attained a high ground speed which may be close to that required for take-off. At the last moment, the decision is made to abort, i.e. cancel the take-off. The only thing available to bring the airplane to a complete stop before the end of the runway is the brakes. To accomplish this, the pilot must "stand on" the brakes, i.e. fully apply them and hold them until the plane stops. The result is a heat build-up that cannot be successfully dissipated in time. The rotors 10' and stators 20—literally become so hot that as soon as the plane stops (or perhaps sooner), they weld together. Moreover, the built up heat travels to the surrounding structure and the wheels and may even start those on fire. If the brakes seize before the airplane stops, the rubber wheels drag instead of rotating thereby quickly wearing through them whereupon they burst, causing the supporting structure to drag on the ground and maybe collapse. In short, it can be something that is going to require extensive repair of the airplane before it will be able to fly again.

To solve the above-describe problem, carbon/carbon brakes were developed and are in use in the prior art. Carbon/carbon brakes have a number of problems—they provide low friction characteristics until they get hot, they are porous and therefore can be contaminated by de-icing or other fluids, they oxidize at a temperature similar to that realized during "heavy Taxing", they generate corrosive dust, and they are very expensive and time consuming to make. The carbon rotors 10' and carbon stators 20 are created by an infiltration process that is very expensive and literally takes weeks to accomplish. The cold stack 22 has a very low coefficient of friction and will not stop the plane. Thus, when first taxiing, the pilot must periodically apply the brakes to cause sufficient heat build-up such that the airplane can be stopped with the brakes when the need arises. Should the is need arise before sufficient friction has built up, the airplane cannot be stopped and a large-scale wreck can occur. Because the problem of break seizure is eliminated, most airlines and the military presently use the carbon/carbon brakes despite their shortcomings.

Truck, train, and racing applications could also utilize a better breaking system providing lighter weight and longer endurance than current technology braking materials.

Wherefore, it is an object of this invention to provide a seizure-resistant stack type brake system for aircraft and the like which is low cost and easily repairable.

It is another object of this invention to provide a seizure-resistant stack type brake system for aircraft and the like which has a high coefficient of friction even when cold.

It is still another object of this invention to provide a seizure-resistant stack type brake system for aircraft and the like which employs brake pads which can be replaced without having to replace the entire stack of rotors and stators.

It is yet another object of the present invention to provide a brake rotor/drum/pad material that is resistant to destruction in any application involving high frictional braking forces and extremely high generated heat.

It is a further object of the present invention to provide a brake rotor material that is resistant to destruction in any application involving high frictional braking forces and extremely high generated heat.

Other objects and benefits of this invention will become apparent from the description which follows hereinafter when read in conjunction with the drawing figures which accompany it.

SUMMARY OF THE DISCLOSURE

The foregoing objects have been achieved by a method of forming a high temperature and wear resistant brake pad and of attaching it to a brake part comprising the steps of, forming a brake rotor/stator or pad of a structural fiber reinforced ceramic matrix composite material comprising a generic fiber system and an erosion resistant/friction-producing material disposed throughout a fired polymer-derived ceramic resin; riveting or bonding the brake pad to a surface of the brake part; and, smoothing a contacting braking surface of the brake pad as necessary.

The preferred method of making rotors and drums includes the steps of, choosing the polymer-derived ceramic resin from silicon-carboxyl resin or alumina silicate resin; and, using a generic fiber system from alumina, Nextel 312, Nextel 440, Nextel 510, Nextel 550, silicon nitride, silicon carbide, HPZ, graphite, carbon, and peat.

Optionally to achieve a tougher material, the method includes the additional step of disposing an interface material over fibers of the generic fiber system thereby preventing the fired polymer-derived ceramic resin from adhering directly to the fibers. Where employed, that step comprises disposing the interface material as a few microns thickness of carbon, silicon nitride, silicon carbide, or boron nitride.

The preferred method also includes the step of disposing approximately 25% by volume of alumina, mulite, or an equivalent powder throughout fibers of the generic fiber system at least adjacent the contacting braking surface.

The method may, if appropriate to the physiology of the generic fiber system, include the step of disposing fibers of the generic fiber system adjacent the contacting braking surface parallel to the contacting braking surface. It may also include disposing the fibers of the generic fiber system adjacent the contacting braking surface along circular arc segments and radial lines with respect to a center of rotation of a brake component to contact the contacting braking surface.

As an alternate to riveting or adhesively bonding if a suitable temperature resistant adhesive is developed, the invention also includes a method of forming a high temperature and wear resistant brake pad and of attaching it to a brake part comprising the steps of, forming a brake pad having attaching members extending therefrom of a structural fiber reinforced ceramic matrix composite material comprising a generic fiber system and an erosion resistant/friction-producing material disposed throughout a fired polymer-derived ceramic resin; placing the brake pad in a mold for the brake part with the attaching members extending into a portion of the mold to be filled with metal forming the brake part; and, filling the mold with molten metal to form the brake part and capture the attaching members therein.

That method may also include the additional steps of removing the brake part from the mold; machining and finishing the brake part as necessary; and, smoothing a contacting braking surface of the brake pad as necessary.

BRIEF DESCRIPTION OF THE DRAWINGS

FIG. 1 is a simplified front view drawing of a prior art caliper disk brake of the type used on automobiles.

FIG. 2 shows the prior art disk brake of FIG. 1 with a monolithic ceramic coating on the faces of the rotor as suggested in the prior art.

FIG. 3 is a simplified front view drawing of a prior art aircraft brake.

FIGS. 6 through 7 depict the method of relining the brake components of FIG. 5 according to the present invention.

DETAILED DESCRIPTION OF THE PREFERRED EMBODIMENT

Figure 4:
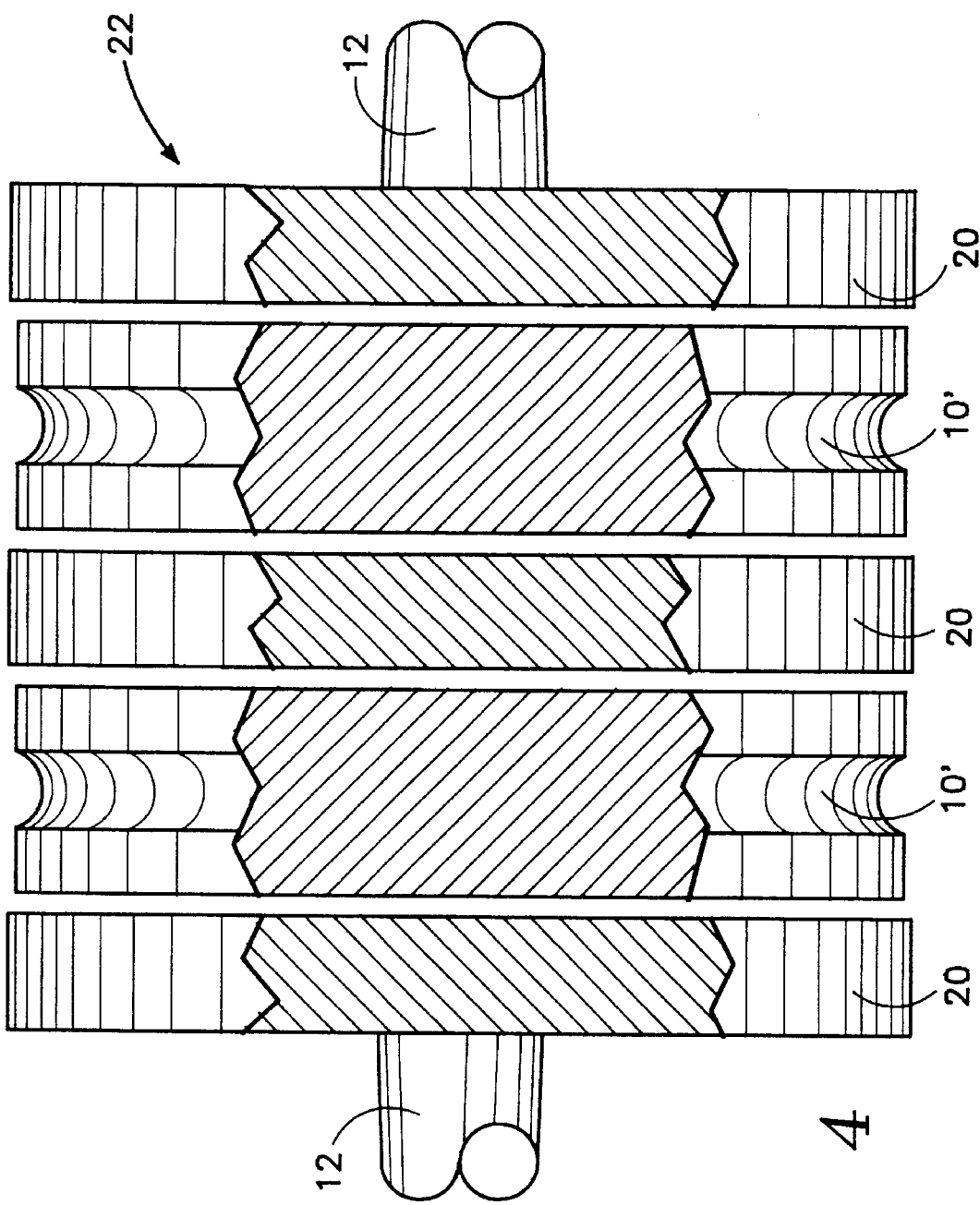
FIG. 4 is an enlarged and partially cutaway drawing of an aircraft brake according to the present invention in a first embodiment.

According to one aspect of the present invention directed specifically to aircraft brakes as depicted in FIG. 4, the parts of an aircraft brake stack 22 are made of a structural fiber reinforced ceramic composite matrix (FRCMC) material modified specifically for brake use. In this regard, the FRCMC brake material of this invention is akin to the rotors and stators being made entirely of a quasi-sintered brake pad material able to withstand the heat and frictional forces of aircraft braking. That is, the FRCMC brake material of this invention comprises a fiber impregnated ceramic material which also includes friction-producing elements. As described in a co-pending application entitled HIGH-EFFICIENCY, LOW-POLLUTION ENGINE by the inventors herein, Ser. No. 08/515,604 filed on even date herewith and assigned to the common assignee of this application, the teachings of which are incorporated herein by reference, an improved structural FRCMC material is disclosed having high breakage resistance and particular applicability to use for parts in high temperature applications. Thus, with additional modification, it is particularly well suited to achieve the objectives of this invention. The FRCMC of that invention employs any of several polymer-derived ceramic resins commercially available such as silicon-carboxyl resin (sold by Allied Signal under the trade name Blackglas) or alumina silicate resin (sold by Applied Poleramics under the product designation CO2) combined with a generic fiber system such as, but not limited to, alumina, Nextel 312, Nextel 440, Nextel 510, Nextel 550, silicon nitride, silicon carbide, HPZ, graphite, carbon, and peat. To accomplish the objectives of the invention, the fiber system is first coated to 0.1–5.0 microns thickness with an interface material such as carbon, silicon nitride, silicon carbide, or boron nitride. The interface material prevents the resin from adhering directly to the fibers of the fiber system. Thus, when the resin has been converted into a ceramic, there is a slight play between the ceramic and fibers imparting the desired qualities to the final FRCMC.

As further described in another co-pending application incorporated herein by reference entitled REDUCING WEAR BETWEEN STRUCTURAL FIBER REINFORCED CERAMIC MATRIX COMPOSITE AUTOMOTIVE ENGINE PARTS IN SLIDING CONTACTING RELATIONSHIP by the inventors herein, Ser. No. 08/515, 927 filed on even date herewith and assigned to the common assignee of this application, the surface of the structural FRCMC material can be treated to reduce wear/erosion in such applications by applying an erosion-resistant coating. The preferred example given is alumina or mulite applied by plasma spraying. Surface wear can also be reduced by not employing the generic fiber system in the form of a woven cloth mat at least adjacent the surface; but rather, by employing free fibers that are substantially parallel to the surface. For a rotating brake system, (we probably will be random mat or circular arcs) it would appear that the best orientation would be for the fibers to lie along circular arc segments or radial lines with respect to the rotational center of the part.

While such a material would probably work for brake components, having the necessary strength and wear resistance, it is preferred to modify the composition to increase the frictional coefficient of the material and therefore its braking efficiency while, at the same time, improving its total wear or erosion resistance in the manner of sintered brake shoes rather than providing erosion resistance only at the surface such that it is lost after the surface is worn away from use. To this end, the friction-inducing, erosion-resistant material is mixed in with the resin/fiber mixture prior to part formulation and firing. As in the case where erosion resistance is desired at the surface and alumina or mulite powder is plasma-sprayed onto the surface, according to this invention the alumina or mulite powder (or any substitute having like properties) is mixed into the resin along with the fibers prior to part formulation and firing. At this time, it is believed that approximately 25% by volume of the alumina or mulite powder will provide the best results.

Thus, according to the present invention, the steps of constructing a brake part such as the rotors 10' and stators 20 of FIG. 4 comprise mixing approximately 25% by volume alumina or mulite powder, or equivalent, with the fiber system, mixing the powder-coated fiber system with the resin, forming the part with the resin mixture, and firing the resultant part at a temperature in the neighborhood of 1,800 F as suggested by the manufacturer to convert the resin into a ceramic. Alternatively, the fibers can be coated first with the above-described interface material before the alumina or mulite powder is added if an end structure having the qualities that the interface material adds is desired for the particular application.

Figure 5:
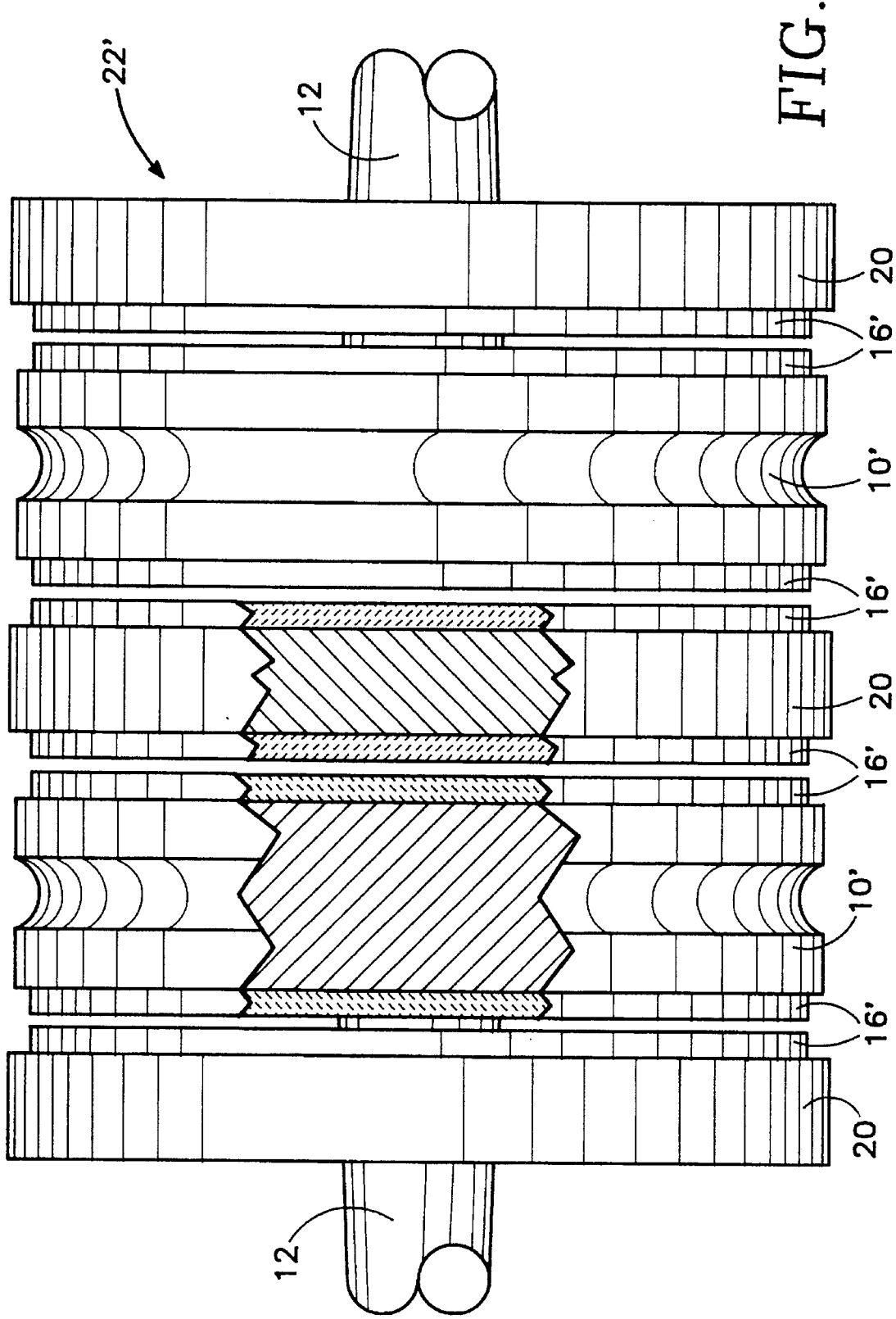
FIG. 5 is an enlarged drawing of an aircraft brake according to the present invention in a second embodiment.

Because it has qualities that conventional sintered brake pads and the like do not have such as heat and wear/erosion resistance under extreme temperatures, the above-described FRCMC brake material of this invention can be made into a replaceable brake pad for use in any brake system employing brake pads. Such an aircraft brake stack 22' is depicted in FIG. 5. The conventional steel rotors 10' and stators 20 have brake pads 16' according to the present invention covering their braking surfaces. Thus, instead of having to replace the rotors 10' and stators 20 as required with the present steel/steel and carbon/carbon brakes, the brakes can be "re-lined" in the manner of automotive brakes thereby greatly reducing the time and cost involved.

Originally, automotive brake pads were riveted to the brake shoes carrying them. More recently with the advent of appropriate adhesives, so-called "bonded" brake pads have been employed wherein the pads are attached with adhesive to the shoes. This reduces the incidence of the rivets "scoring" the brake drums or brake rotors when the brake pads wear down too far past the point of needing replacement. With the bonded brake pads, the pads must wear to the point that the shoe itself is contacting the drum or rotor before damage can occur. Unfortunately, there is no commercially available adhesive or bonding method that can attach the brake pads 16' to the rotors 10' and stators 20 and resist the temperatures generated during braking. Thus, an alternate method of bonding the pads 16' to the rotors 10' and stators 20 must be employed.

One approach as depicted in FIGS. 6 and 7 and adapted for "relining" the rotors 10' and stators 20 is to employ rivets 26. As depicted in FIG. 6, the old pad 16' is first removed and discarded. As depicted in FIG. 7, the new pad 16' is then positioned on the rotor 10' and riveted in place with rivets 26. Following the riveting, the surface 28 of the pad 16' can be ground smooth and parallel if necessary.

Figure 8:
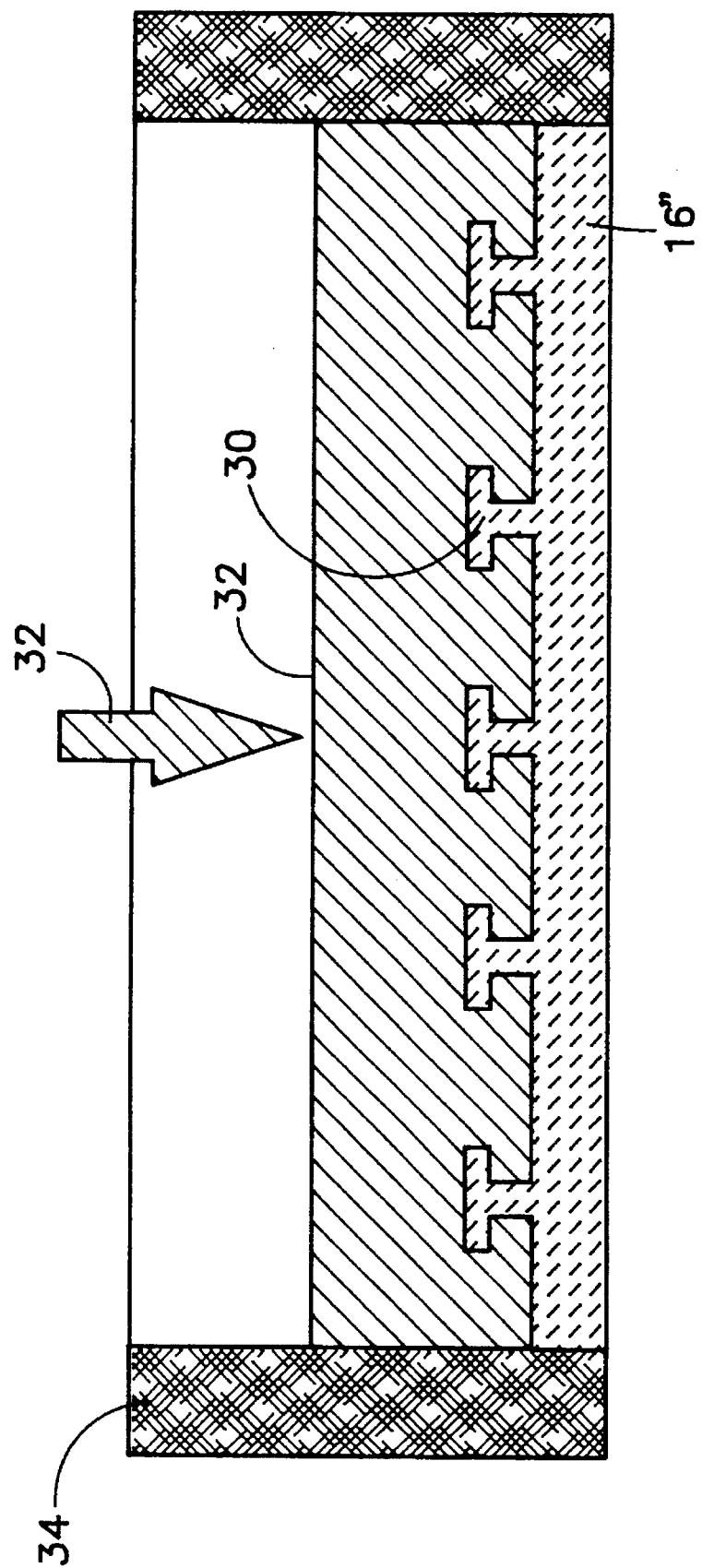
FIG. 8 depicts a method of permanently attaching a FRCMC brake pad to a metal rotor, stator, or shoe by casting it in place.

In another approach not intended for relining but lower production costs as depicted in FIG. 8, the pads 16" are provided with gripping members 30 extending from the rear thereof. Since the pads 16" are able to withstand extremes of temperature including that of molten metal, the rotor 10' (or stator 20) can be cast onto the pad(s) 16". The pads 16" are placed within a mold 34 for the part to be cast (rotor 10' or stator 20). The molten metal 32 is then poured into the mold 34 and allowed to harden. The finished part is then removed and machined or otherwise finished as necessary.

Wherefore, having thus described the present invention, What is claimed is:

1. An aircraft brake stack comprising a plurality of rotors and stators having good frictional qualities and being highly temperature resistant comprising:

the plurality of rotors and stators being formed of a structural fiber reinforced ceramic matrix composite material comprising a generic fiber system and an erosion-resistant/friction-inducing material disposed throughout a polymer-derived ceramic resin in its ceramic form.

2. The aircraft brake stack of claim 1 wherein:
   a) said polymer-derived ceramic resin is chosen from silicon-carboxyl resin, alumina silicate resin, or an equivalent; and,
   b) said generic fiber system comprises alumina, Nextel 312, Nextel 440, Nextel 510, Nextel 550, silicon nitride, silicon carbide, HPZ, graphite, carbon, or peat.

3. The aircraft brake stack of claim 1 and additionally comprising:
   an interface material disposed over fibers of said generic fiber system preventing said fired polymer-derived ceramic resin from adhering directly to said fibers.

4. The aircraft brake stack of claim 3 wherein:
   said interface material comprises 0.1–5.0 microns thickness of carbon, silicon nitride, silicon carbide, or boron nitride.

5. The aircraft brake of claim 1 wherein:
   said erosion-resistant/friction-producing material comprises alumina or mulite.

6. The aircraft brake stack of claim 5 wherein:
   said alumina or mulite is approximately 25% by volume.

7. The aircraft brake stack of claim 1 wherein:
   fibers of said generic fiber system adjacent contacting surfaces are parallel to said contacting surfaces.

8. The aircraft brake stack of claim 7 wherein additionally:
   said fibers of said generic fiber system adjacent said contacting surfaces are disposed along circular arc segments and radial lines with respect to a center of rotation of the stack.

9. An aircraft brake stack comprising a plurality of rotors and stators having good frictional qualities and being highly temperature resistant comprising:
   a) a plurality of rotors and stators formed of a metal; and,
   b) a plurality of brake pads disposed on adjacent contacting braking surfaces of said plurality of rotors and stators, said plurality of brake pads being formed of a structural fiber reinforced ceramic matrix composite material comprising a generic fiber system and an erosion-resistant/friction-producing material disposed throughout a fired polymer-derived ceramic resin.

10. The aircraft brake stack of claim 9 wherein:
    a) said polymer-derived ceramic resin is chosen from silicon-carboxyl resin, alumina silicate resin, or an equivalent; and,
    b) said generic fiber system comprises alumina, Nextel 312, Nextel 440, Nextel 5 10, Nextel 5 550, silicon nitride, silicon carbide, HPZ, graphite, carbon, or peat.

11. The aircraft brake stack of claim 9 and additionally comprising:
    an interface material disposed over fibers of said generic fiber system preventing said polymer-derived ceramic resin in its ceramic form from adhering directly to said fibers.

12. The aircraft brake stack of claim 11 wherein:
    said interface material comprises 0.1–5.0 microns thickness of carbon, silicon nitride, silicon carbide, or boron nitride.

13. The aircraft brake stack of claim 9 and additionally comprising:
    an erosion-resistant/friction-producing material disposed throughout fibers of said generic fiber system.

14. The aircraft brake stack of claim 13 wherein:
    said erosion-resistant/friction-producing material comprises alumina, mulite, or an equivalent.

15. The aircraft brake stack of claim 14 wherein:
    said alumina or mulite is approximately 25% by volume.

16. The aircraft brake stack of claim 9 wherein:
    fibers of said generic fiber system adjacent said contacting braking surfaces are parallel to said contacting braking surfaces.

17. The aircraft brake stack of claim 16 wherein additionally:
    said fibers of said generic fiber system adjacent said contacting braking surfaces are disposed along circular arc segments and radial lines with respect to a center of rotation of the stack.

18. The aircraft brake stack of claim 9 wherein:
    said plurality of brake pads are mechanically fastened to said adjacent contacting braking surfaces of said plurality of rotors and stators.

19. The aircraft brake stack of claim 9 wherein:
    said plurality of brake pads have retaining members extending therefrom and are attached to said adjacent contacting braking surfaces of said plurality of rotors and stators by said retaining members being disposed within the metal of said plurality of rotors and stators.

20. A high temperature and wear resistant brake pad comprising:
    a brake pad formed of a structural fiber reinforced ceramic matrix composite material comprising a generic fiber system and an erosion-resistant/friction-producing material disposed throughout a polymer-derived ceramic resin in its ceramic form.

21. The brake pad of claim 20 wherein:
    a) said polymer-derived ceramic resin is silicon-carboxyl resin, alumina silicate resin, or an equivalent; and,
    b) said generic fiber system comprises alumina, Nextel 312, Nextel 440, Nextel 510, Nextel 550, silicon nitride, silicon carbide, HPZ, graphite, carbon, or peat.

22. The brake pad of claim 20 and additionally comprising:
    an interface material disposed over fibers of said generic fiber system preventing said polymer-derived ceramic resin in its ceramic form from adhering directly to said fibers.

23. The brake pad of claim 22 wherein:
    said interface material comprises 0.1–5.0 microns thickness of carbon, silicon nitride, silicon carbide, or boron nitride.

24. The brake pad of claim 20 and additionally comprising:
    an erosion-resistant/friction-producing material disposed throughout fibers of said generic fiber system.

25. The brake pad of claim 24 wherein:
    said erosion-resistant/friction-producing material comprises alumina, mulite, or an equivalent.

26. The brake pad of claim 25 wherein:
    said alumina or mulite is approximately 25% by volume.

27. The brake pad of claim 20 wherein:
    fibers of said generic fiber system adjacent a contacting braking surface are parallel to said contacting braking surface.

28. The brake pad of claim 27 wherein additionally:
    said fibers of said generic fiber system adjacent said contacting braking surface are disposed along circular arc segments and radial lines with respect to a center of rotation of a brake component contacting the brake pad.

29. The brake pad of claim 20 wherein additionally:

the brake pad includes means for mechanically fastening it to a brake part.

30. The brake pad of claim 20 wherein:

the brake pad includes attachment means extending therefrom for attaching the brake pad to a brake part by casting said attachment means into metal comprising said brake part.

31. A method of forming a high temperature and wear resistant brake pad and of attaching it to a brake part comprising the steps of:

a) forming a brake pad of a structural fiber reinforced ceramic matrix composite material comprising a generic fiber system and an erosion-resistant, friction producing material disposed throughout a polymer-derived ceramic resin in its ceramic form;

b) riveting the brake pad to a surface of the brake part; and, c) smoothing a contacting braking surface of the brake pad as necessary.

32. A method of forming a high temperature and wear resistant brake pad and of attaching it to a brake part comprising the steps of:

a) forming a brake pad having attaching members extending therefrom of a structural fiber reinforced ceramic matrix composite material comprising a generic fiber system and an erosion-resistant/friction-producing material disposed throughout a polymer-derived ceramic resin in its ceramic form;

b) placing the brake pad in a mold for the brake part with the attaching members extending into a portion of the mold to be filled with metal forming the brake part; and, c) filling the mold with metal to form the brake part and capture the attaching members therein.

33. The method of claim 32 and additionally comprising the steps of:

a) removing the brake part from the mold;

b) machining and finishing the brake part as necessary; and, c) smoothing a contacting braking surface of the brake pad as necessary.

* * * * *